(12) United States Patent
Ortega

(10) Patent No.: US 6,426,696 B1
(45) Date of Patent: Jul. 30, 2002

(54) BRAKE LIGHT SYSTEM FOR VEHICLES

(76) Inventor: Irene M. Ortega, P.O. Box 461377, Los Angeles, CA (US) 90046

( * ) Notice: Subject to any disclaimer, the term of this patent is extended or adjusted under 35 U.S.C. 154(b) by 0 days.

(21) Appl. No.: 09/726,672

(22) Filed: Nov. 29, 2000

(51) Int. Cl.[7] .................................................. B60Q 1/26
(52) U.S. Cl. ........................ 340/479; 340/472; 340/473; 340/463; 340/464; 340/468
(58) Field of Search ................................. 340/479, 468, 340/464, 473, 472, 463

(56) References Cited

U.S. PATENT DOCUMENTS

| | | |
|---|---|---|
| 1,500,998 A | 7/1924 | Kuhn |
| 1,614,732 A | 1/1927 | Gough |
| 1,704,774 A | 3/1929 | Svec |
| 1,746,049 A | 2/1930 | Parker |
| 1,839,499 A | 1/1932 | Rava |
| 3,696,334 A * | 10/1972 | Demeter ..................... 340/134 |
| 4,051,361 A * | 9/1977 | Lichon et al. ............... 362/211 |
| 4,574,269 A | 3/1986 | Miller ........................ 340/97 |
| 4,631,516 A * | 12/1986 | Clinker ....................... 340/76 |
| 5,648,756 A | 7/1997 | Zadok ........................ 340/468 |
| 5,652,565 A | 7/1997 | Salcedas et al. ............ 340/479 |
| 5,838,228 A | 11/1998 | Clark .......................... 340/436 |
| 5,847,646 A | 12/1998 | Mucciacciaro .............. 340/479 |
| 5,905,434 A * | 5/1999 | Steffan et al. .............. 340/464 |
| 6,030,105 A * | 2/2000 | Thau et al. .................. 340/602 |

* cited by examiner

Primary Examiner—Jeffery Hofsass
Assistant Examiner—Hung Nguyen
(74) Attorney, Agent, or Firm—Joseph N. Breaux

(57) ABSTRACT

A brake indicator system for a vehicle that includes a stop indicator sign assembly and a stop indicator sign illuminator having an illumination source electrically connectable in connection with a brake light circuit of a vehicle such that the illumination source emits light when the brake lights of the vehicle are on and does not illuminate light when the brake lights of the vehicle are off. The stop indicator sign assembly includes a stop indicator sign assembly housing having a sign cavity provided therein within which an electrically driven retraction/extension mechanism having a stop indicator sign wound thereon is positioned; the electrically driven retraction/extension mechanism having an activation input wire connectable to a brake light circuit of an existing vehicle such that when the brake lights of the vehicle are activated the stop indicator sign is extended out of the cavity by the electrically driven retraction/extension mechanism and when the brake lights of the vehicle are deactivated the stop indicator sign is retracted into the cavity by the electrically driven retraction/extension mechanism. The stop indicator sign has letters thereon constructed from a light transmissive material that spell a desired stop message which is illuminated by the stop indicator sign illuminator when the brake lights of the vehicle are on.

2 Claims, 2 Drawing Sheets

BRAKE LIGHT SYSTEM FOR VEHICLES

TECHNICAL FIELD

The present invention relates to vehicle safety lights and more particularly to a brake light system for vehicles that includes a stop indicator sign assembly, a stop indicator sign illuminator having an illumination source electrically connectable in connection with a brake light circuit of a vehicle such that the illumination source emits light when the brake lights of the vehicle are on and does not illuminate light when the brake lights of the vehicle are off, a radio frequency activated camera assembly attached to the stop indicator sign assembly, and a key chain radio frequency camera activation remote control; the stop indicator sign assembly including a stop indicator sign assembly housing having a sign cavity provided therein within which an electrically driven retraction/extension mechanism having a stop indicator sign wound thereon is positioned; the electrically driven retraction/extension mechanism having an activation input wire connectable to a brake light circuit of an existing vehicle such that when the brake lights of the vehicle are activated the stop indicator sign is extended out of the cavity by the electrically driven retraction/extension mechanism and when the brake lights of the vehicle are deactivated the stop indicator sign is retracted into the cavity by the electrically driven retraction/extension mechanism; the stop indicator sign having letters thereon constructed from a light transmissive material and spelling a desired stop message which is illuminated by the stop indicator sign illuminator when the brake lights of the vehicle are on; the radio frequency activated camera assembly including a lens aimed away from the stop indicator sign assembly such that in use the lens is aimed toward following vehicles; the radio frequency activated camera assembly being activated by a user by depressing an activation button on the key chain radio frequency camera activation remote control to take a picture of a following vehicle should the driver believe he/she is about to be rear ended by a following vehicle.

BACKGROUND ART

It is often desirable for the driver of a first vehicle to provide drivers of following vehicles with information that the first vehicle is about to stop. The faster the following drivers receive this information the faster they can react by applying their own brakes so that a rear end collision may be avoided. It would be a benefit, therefore, to have a brake light system for vehicles that would provide following drivers with a more substantial warning than just an increase in intensity of the tail lights of the vehicle in front. In addition, it would be a further benefit, if a vehicle is traveling to close behind, to have a camera system that could be activated to take a picture as evidence of the distance the car was following should there be a rear end collision.

GENERAL SUMMARY DISCUSSION OF INVENTION

It is thus an object of the invention to provide a brake light system for vehicles that includes a stop indicator sign assembly, and a stop indicator sign illuminator having an illumination source electrically connectable in connection with a brake light circuit of a vehicle such that the illumination source emits light when the brake lights of the vehicle are on and does not illuminate light when the brake lights of the vehicle are off; the stop indicator sign assembly including a stop indicator sign assembly housing having a sign cavity provided therein within which an electrically driven retraction/extension mechanism having a stop indicator sign wound thereon is positioned; the electrically driven retraction/extension mechanism having an activation input wire connectable to a brake light circuit of an existing vehicle such that when the brake lights of the vehicle are activated the stop indicator sign is extended out of the cavity by the electrically driven retraction/extension mechanism and when the brake lights of the vehicle are deactivated the stop indicator sign is retracted into the cavity by the electrically driven retraction/extension mechanism; the stop indicator sign having letters thereon constructed from a light transmissive material and spelling a desired stop message which is illuminated by the stop indicator sign illuminator when the brake lights of the vehicle are on.

It is another object of the invention to provide a brake light system for vehicles as described that also includes a radio frequency activated camera assembly attached to the stop indicator sign assembly, and a key chain radio frequency camera activation remote control; the radio frequency activated camera assembly including a lens aimed away from the stop indicator sign assembly such that in use the lens is aimed toward following vehicles; the radio frequency activated camera assembly being activated by a user by depressing an activation button on the key chain radio frequency camera activation remote control to take a picture of a following vehicle should the driver believe he/she is about to be rear ended by a following vehicle.

Accordingly, a brake light system for vehicles is provided. The brake light system for vehicles includes a stop indicator sign assembly, and a stop indicator sign illuminator having an illumination source electrically connectable in connection with a brake light circuit of a vehicle such that the illumination source emits light when the brake lights of the vehicle are on and does not illuminate light when the brake lights of the vehicle are off; the stop indicator sign assembly including a stop indicator sign assembly housing having a sign cavity provided therein within which an electrically driven retraction/extension mechanism having a stop indicator sign wound thereon is positioned; the electrically driven retraction/extension mechanism having an activation input wire connectable to a brake light circuit of an existing vehicle such that when the brake lights of the vehicle are activated the stop indicator sign is extended out of the cavity by the electrically driven retraction/extension mechanism and when the brake lights of the vehicle are deactivated the stop indicator sign is retracted into the cavity by the electrically driven retraction/extension mechanism; the stop indicator sign having letters thereon constructed from a light transmissive material and spelling a desired stop message which is illuminated by the stop indicator sign illuminator when the brake lights of the vehicle are on.

In a preferred embodiment, the brake light system for vehicles further includes a radio frequency activated camera assembly attached to the stop indicator sign assembly, and a key chain radio frequency camera activation remote control; the radio frequency activated camera assembly including a lens aimed away from the stop indicator sign assembly such that in use the lens is aimed toward following vehicles; the radio frequency activated camera assembly being activated by a user by depressing an activation button on the key chain radio frequency camera activation remote control to take a picture of a following vehicle should the driver believe he/she is about to be rear ended by a following vehicle.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
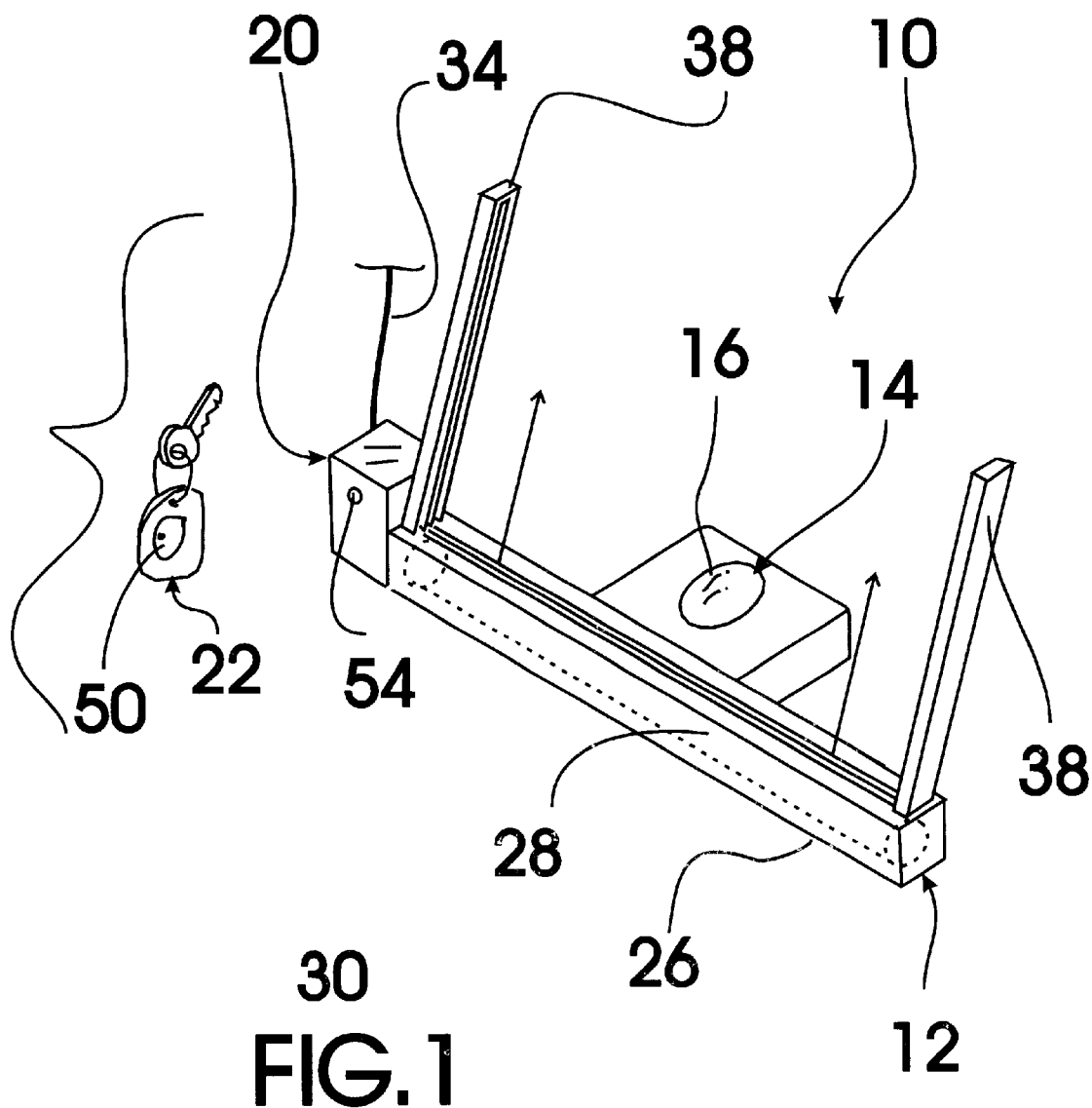
FIG. 1 is a perspective view of the brake light system for vehicles of the present invention with the stop indicator sign in the retracted position within the stop indicator sign assembly housing, the stop indicator sign illuminator positioned behind the stop indicator sign assembly housing, the radio frequency activated camera assembly attached to the stop indicator sign assembly, and the key chain radio frequency camera activation remote.
Figure 2:
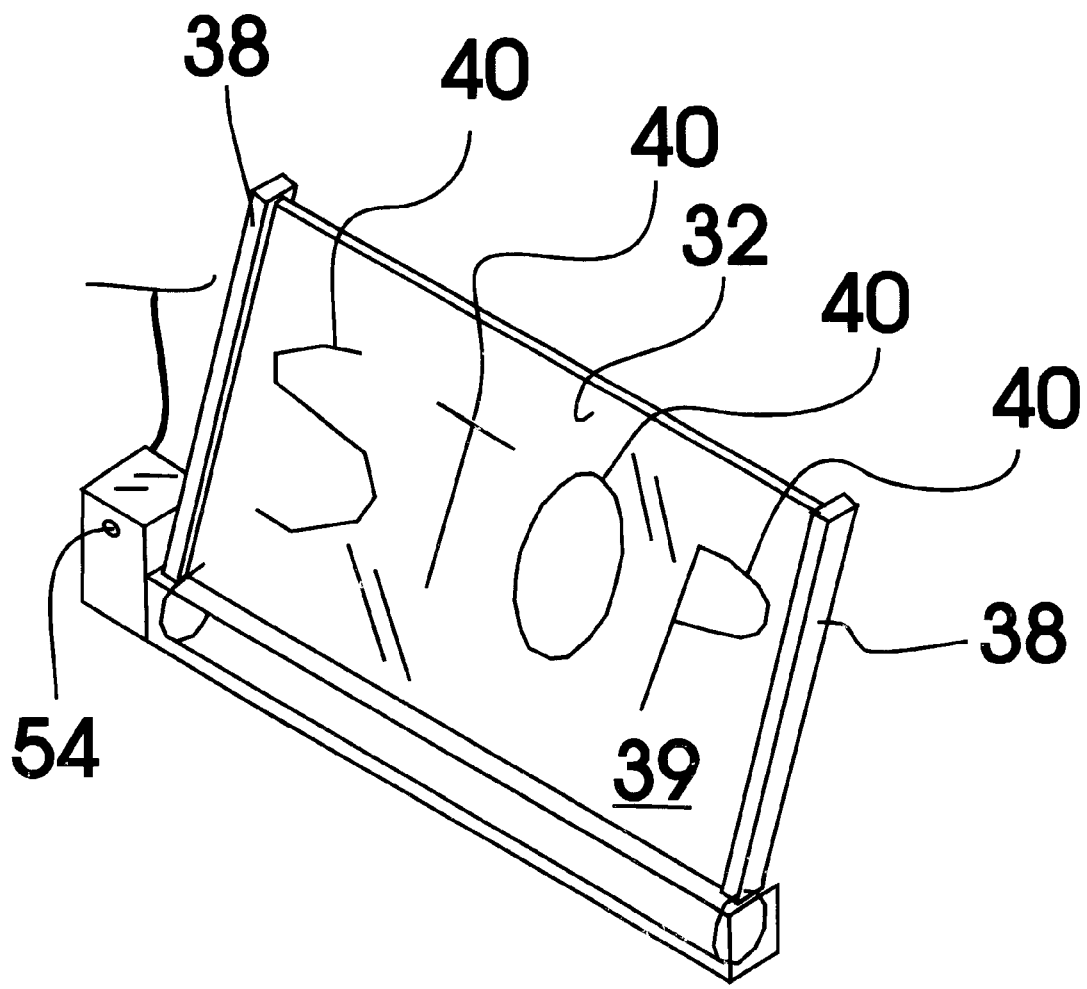
FIG. 2 is a perspective view of the brake light system for vehicles of the present invention with the stop indicator sign in the extended position between the two spaced indicator sign guide channel members; the stop indicator sign illuminator in the illuminating mode causing transparent letters of the stop indicator sign to transmit light therethrough to allow a following vehicle to easily read the message on the stop indicator sign.

FIGS. 1 and 2 show various aspects of an exemplary embodiment of the brake light system for vehicles of the present invention generally designated 10. Brake light system for vehicles 10 is adapted for mounting to the back dashboard of a vehicle or against the back window of a pickup truck or SUV. Brake light system for vehicles 10 includes a stop indicator sign assembly, generally designated 12; a stop indicator sign illuminator, generally designated 14, having an illumination source 16 electrically connectable in connection with a brake light circuit of a vehicle such that the illumination source 16 emits light when the brake lights of the vehicle are on and does not illuminate light when the brake lights of the vehicle are off; a radio frequency activated camera assembly, generally designated 20, attached to stop indicator sign assembly 12; and a key chain radio frequency camera activation remote control, generally designated 22.

Stop indicator sign assembly 12 includes a stop indicator sign assembly housing 26 having a sign cavity 28 provided therein within which an electrically driven retraction/extension mechanism 30 having a stop indicator sign 32 wound thereon is positioned. Electrically driven retraction/extension mechanism 30 has an activation input wire 34 connectable to a brake light circuit of an existing vehicle such that when the brake lights of the vehicle are activated the stop indicator sign 32 is extended out of cavity 28 by electrically driven retraction/extension mechanism 30 and supported by two spaced sign support channel members 38 and when the brake lights of the vehicle are deactivated stop indicator sign 32 is retracted into cavity 28 by electrically driven retraction/extension mechanism 30.

Stop indicator sign 32 includes a flexible opaque or translucent plastic sheet 39 and transparent colored plastic letters 40 thereon that spell a desired stop message, inn this example "STOP" which is illuminated by stop indicator sign illuminator 14 when the brake lights of the vehicle are on. A retractable and extendable stop indicator sign 32 is used along with the electrically driven retraction/extension mechanism 30 so that a large display may be used when needed but rapidly stored away when not needed to allow the driver to see out of the rear windshield. In this embodiment, the brake light system for vehicles 10 also includes the radio frequency activated camera assembly 20 and the key chain radio frequency camera activation remote control 22 having an activation button 50. When activation button 50 on key chain radio frequency camera activation remote control 22 is depressed by the driver, radio frequency activated camera assembly 20 takes a picture through a lens 54 that is aimed away from the stop indicator sign assembly such that in use the lens 54 is aimed toward following vehicles.

It can be seen from the preceding description that a brake light system for vehicles has been provided.

It is noted that the embodiment of the brake light system for vehicles described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A brake light system for vehicles comprising:

a stop indicator sign assembly; and a stop indicator sign illuminator having an illumination source electrically connectable in connection with a brake light circuit of a vehicle such that the illumination source emits light when the brake lights of the vehicle are on and does not illuminate light when the brake lights of the vehicle are off;

the stop indicator sign assembly including a stop indicator sign assembly housing having a sign cavity provided therein within which an electrically driven retraction/extension mechanism having a stop indicator sign wound thereon is positioned;

the electrically driven retraction/extension mechanism having an activation input wire connectable to a brake light circuit of an existing vehicle such that when the brake lights of the vehicle are activated the stop indicator sign is extended out of the cavity by the electrically driven retraction/extension mechanism and when the brake lights of the vehicle are deactivated the stop indicator sign is retracted into the cavity by the electrically driven retraction/extension mechanism;

the stop indicator sign having letters thereon constructed from a light transmissive material and spelling a desired stop message which is illuminated by the stop indicator sign illuminator when the brake lights of the vehicle are on.

2. The brake light system for vehicles of claim 1 further comprising:

a radio frequency activated camera assembly attached to the stop indicator sign assembly; and a key chain radio frequency camera activation remote control;

the radio frequency activated camera assembly including a lens aimed away from the stop indicator sign assembly such that in use the lens is aimed toward following vehicles;

the radio frequency activated camera assembly being activated by a user by depressing an activation button on the key chain radio frequency camera activation remote control to take a picture of a following vehicle should the driver believe he/she is about to be rear ended by a following vehicle.

* * * * *